United States Patent [19]

Geary

[11] 4,125,927

[45] Nov. 21, 1978

[54] EMBEDDED ARROWHEAD RETRIEVING AND MULTIPURPOSE TOOL

[76] Inventor: James L. Geary, 42319 N. Addison, Antioch, Ill. 60002

[21] Appl. No.: 838,570

[22] Filed: Oct. 3, 1977

[51] Int. Cl.$^2$ .................... B23P 19/04

[52] U.S. Cl. .................... 29/254; 29/255

[58] Field of Search .................... 29/254, 255; 81/52.3, 81/52.35

[56] References Cited

U.S. PATENT DOCUMENTS

| | | | |
|---|---|---|---|
| 1,518,068 | 12/1924 | Horn | 29/255 |
| 3,065,528 | 11/1962 | Marshall | 29/254 |
| 3,519,087 | 7/1970 | Santi | 29/254 |
| 3,691,610 | 9/1972 | Harding | 29/255 |
| 4,043,020 | 8/1977 | Hoggard | 29/254 |

*Primary Examiner*—James L. Jones, Jr.
*Attorney, Agent, or Firm*—Darbo & Vandenburgh

[57] ABSTRACT

A tool for pulling an arrowhead out of, e.g., a tree trunk in which it is embedded comprises a flexible cable threaded at one end to screw into the shank of the arrowhead and a weight to bring a withdrawal impact force to bear at the free end of the cable. The weight may be affixed to the end of the cable or may be provided with a hole through which the weight may be guided along the cable for impact engagement with a stop on the end of the cable. The weight may be used for other purposes, such as holding the arrowhead for sharpening, straightening bent arrow shafts, and other purposes.

3 Claims, 6 Drawing Figures

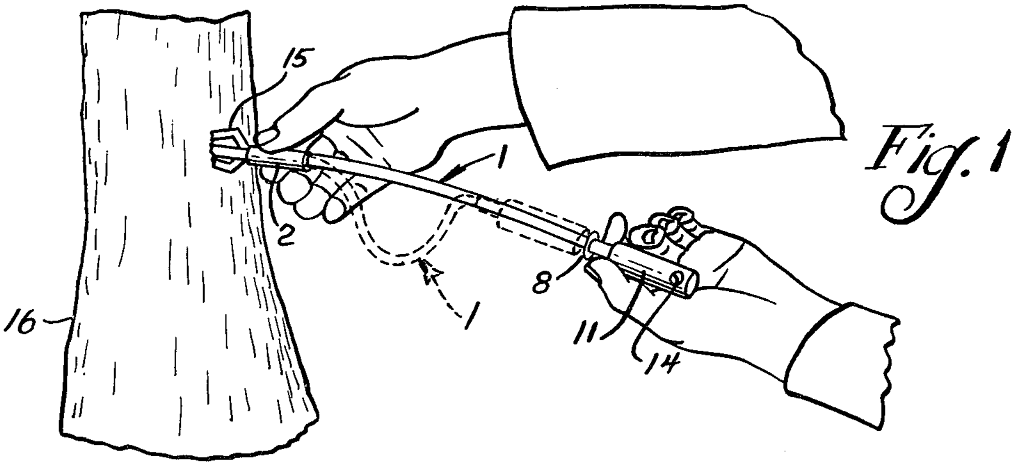
Fig. 1
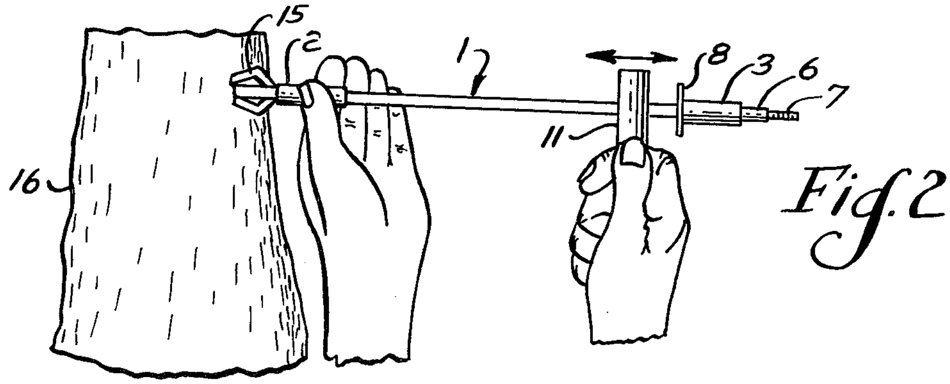
Fig. 2
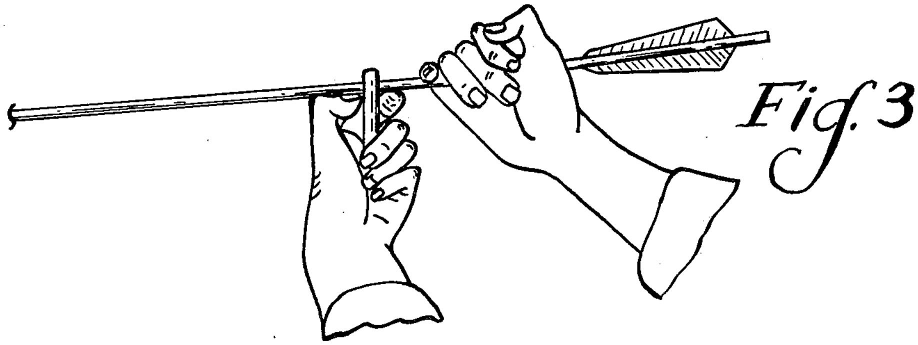
Fig. 3
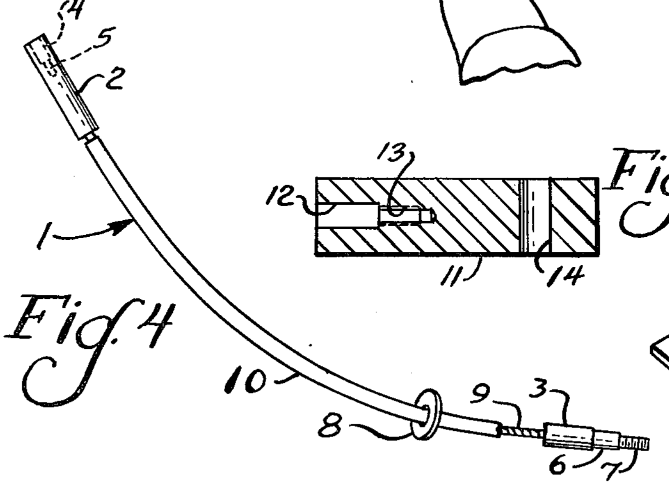
Fig. 4
Fig. 6
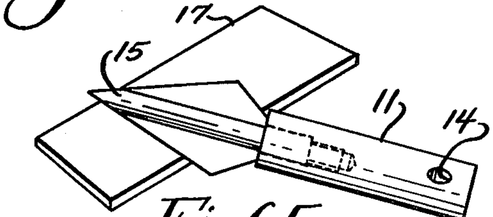
Fig. 5

EMBEDDED ARROWHEAD RETRIEVING AND MULTIPURPOSE TOOL

BACKGROUND AND SUMMARY OF THE INVENTION

Archery is becoming an increasingly popular sport. The design and construction of arrows differ for different purposes and a wide range of qualities are available on the market or may be made by the archers, themselves. The best arrows have aluminum shafts fitted with a threaded socket into which the threaded end of the arrowhead can be screwed. Various types of arrowheads can be screwed onto a standard feathered shaft for different uses, such as target practice, competitive shooting, hunting, etc.

The arrows are propelled with great velocity by the bows, especially by hunting bows which are designed for heavy pulls to impart great force to the arrow after release. Frequently the arrows strike wooden objects, such as the trunks of trees or target backup planking, and are so deeply embedded that they cannot be withdrawn with only the use of hands. The attempted application of maximum withdrawal force by merely grasping with the hands or using, for example, a pair of pliers, also entails the risk of damage to the arrowhead body.

The purpose of the tool of the present invention is to withdraw arrowheads embedded in wood without damage to the arrowheads. The object of the invention is to provide a simple and easily portable tool for this purpose. A further object is to provide such a tool that can be used in various ways to meet the needs of the circumstances of each arrowhead retrieval problem. Another object is to provide such a tool which is also useful to archers for purposes other than arrowhead retrieval, such as straightening bent metal arrow shafts, to provide a handle that can be attached to broadhead arrowheads for use as a knife or for sharpening the arrowhead.

DESCRIPTION OF THE DRAWINGS

In the accompanying drawings,

FIG. 1 is a perspective view showing the tool of the invention attached to an arrowhead embedded in a tree for withdrawal thereof;

FIG. 2 is a view similar to that of FIG. 1 showing a different manner of using the tool for retrieval of an embedded arrowhead;

FIG. 3 is a perspective view showing the use of the retrieval tool weight for straightening a bent arrow shaft;

FIG. 4 is a side view of the embedded arrowhead retrieving and multipurpose tool of the invention with the weight detached therefrom;

FIG. 5 is a perspective view showing the weight of the tool screwed onto a hunting arrowhead for sharpening the latter, and FIG. 6 is a cross-sectional view of the weight.

DESCRIPTION OF SPECIFIC EMBODIMENT

The embedded arrowhead retrieving and multipurpose tool of this invention is a simple but highly effective and portable device. It comprises a flexible cable 1 having fittings 2 and 3 permanently attached to the respective ends of the cable. In the particular design shown for purposes of description of the best presently known embodiment of the invention, fittings 2 and 3 are cylindrical elements arranged as coaxial extensions of the cable. A bore 4 extends axially into element 2 from the free end thereof and terminates in a female threaded portion 5 adapted to screw onto the standard threaded studs which extend rearwardly from arrowheads. Thus, the fitting 2 is a socket which may be screwed onto the threaded stud of an embedded arrowhead after the shaft of the arrow has been unscrewed and thus detached from the arrowhead.

Fitting 3 is also a cylindrical element secured to cable 1 as an axial extension thereof. A stud 6 having a threaded terminal portion 7 extends from the free end of fitting 3.

A washer 8 having a hole which is smaller than the outside diameters of both fittings 2 and 3 is captured between these fittings for free movement to either end of cable 5 for purposes hereinafter explained.

Although the flexible cable 1 is shown as consisting of a steel wire cable 9 covered by a plastic sleeve 10, a bare flexible wire cable or other sufficiently strong flexible tension element, such as a chain, may be employed.

A metal weight 11 serves both as a handle and as a momentum body for imparting impact force for the withdrawal of embedded arrowheads. It is shown separately in cross section in FIG. 6. Like fitting 2, it is provided with an axial bore 12 which terminates with a threaded portion 13 into which stud 6 can be screwed to affix the weight to fitting 3. A diametric hole 14 is provided in weight 11 at the end thereof opposite from bore 12 for purposes that will be explained below.

The primary use of the tool is illustrated in FIGS. 1 and 2 which show alternative modes of operation of the tool. The object is to withdraw arrowhead 15 from the trunk 16 of a tree in which the arrowhead is deeply embedded. The arrow shaft has been disconnected from the arrowhead by unscrewing it and the tool has been attached to the arrowhead by screwing fitting 2 onto the threaded stud of the arrowhead. Then, holding weight 11 in one hand as a tool handle, impact withdrawal force is applied to the arrowhead 15 by moving the weight toward fitting 2 to the slack position of cable 1 shown in dashed lines in FIG. 1 The weight is then drawn outwardly with maximum acceleration to apply an impact withdrawal force to the arrowhead when the weight reaches the limit of movement permitted by the then taut cable. A series of such force-applying movements may be necessary to extract the arrowhead from the tree.

It is desirable to operate the weight along a line approximately coaxial with the arrowhead to avoid any possibility of bending the arrowhead in the process of retrieval.

If several jerks on the tool handle 11 fails to loosen the arrowhead, the method of FIG. 2 may be employed. In this procedure, the weight 11 is arranged to slide along cable 1 through hole 14 and is used as a slide hammer to sharply strike washer 8, as it rests against fitting 3, with the full momentum of the weight to provide the withdrawal impact forces to the arrowhead. Somewhat sharper forces may be delivered by the procedure of FIG. 2 since the force delivered to the remote end of cable 1 is directly transmitted to the arrowhead through the always straight cable.

In accordance with the invention, the weight or handle 11 of the tool may also be used by the archer for a variety of useful purposes. In FIG. 3 the handle is used as a tool to hold the metal shaft of a bent arrow while straightening force is applied by the hand of the operator to straighten the shaft. Or, the handle may be screwed onto an arrowhead 15 to hold the latter firmly for sharpening the cutting edges on sharpening stone 17 as shown in FIG. 5. A convenient bow hanger may be provided by driving an arrowhead with handle 11 attached into a tree. The handle may also be used as a bow counter-balance weight using a suitable stud adapter.

The length of the cable used in the tool is a matter of convenience in use and carrying. It has been found that a cable approximately 8 inches along between end fittings is satisfactory. A 4 or 5 ounce weight is sufficient to provide the needed impact force and is not unduly burdensome to carry. Since, if the weight is to be used in straightening bent arrows, the hole 14 must be larger than the arrow shafts; a diameter of about five-sixteenths inch is suitable.

I claim:

1. An embedded arrowhead retrieving and multipurpose tool comprising a length of flexible cable, first and second fittings secured, respectively, to the ends of said cable, said first fitting comprising a body having a bore extending thereinto from the free end thereof coaxially with said cable, said bore being threaded to receive a threaded arrowhead stud therein, said second fitting comprising means for receiving and transmitting impact force in tension to said cable, and weight means comprising a cylindrical body having a threaded axial bore extending thereinto from one end thereof, the second fitting having a threaded stud extending from the free end thereof coaxially with the cable adapted to be screwed into said bore in said weight to secure said weight to said second fitting and thus to the associated end of said cable, whereby said weight means comprises means for gripping and imparting an impact force to said second fitting by moving same with sufficient velocity axially away from said first fitting to the limit of such movement, said cylindrical body further being provided with a diametric hole near the end thereof opposite the threaded bore, said hole being larger than the cable and the second fitting being provided with stop means whereby said body may alternatively be placed on the flexible cable used as a slide hammer to apply impact force to said stop means.

2. A tool in accordance with claim 1 wherein the diametric hole located in the weight is adapted to receive an arrow shaft whereby said weight may also be used as a tool to straighten bent metal arrow shafts.

3. A tool in accordance with claim 1 wherein the threaded axial bore of the weight is adapted to receive with mating threads the stud of an arrowhead whereby the cylindrical body may be used as a handle in the sharpening of an arrowhead.

* * * * *